(No Model.)
T. EYNON.
MILLING TOOL.
No. 417,776. Patented Dec. 24, 1889.
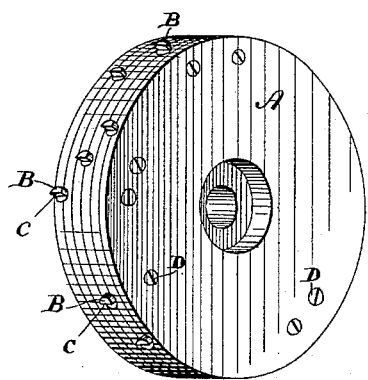
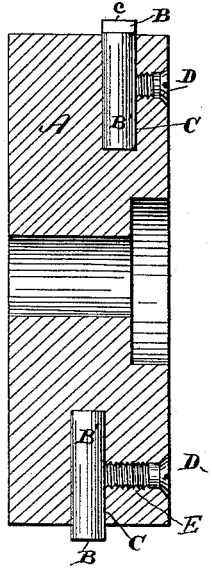
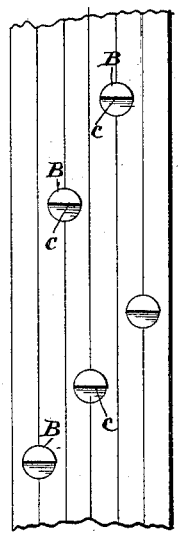
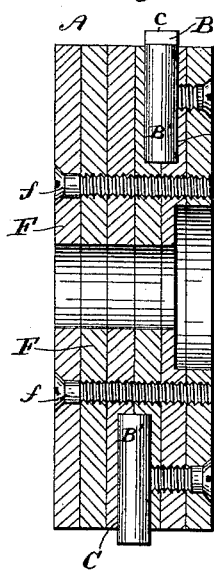
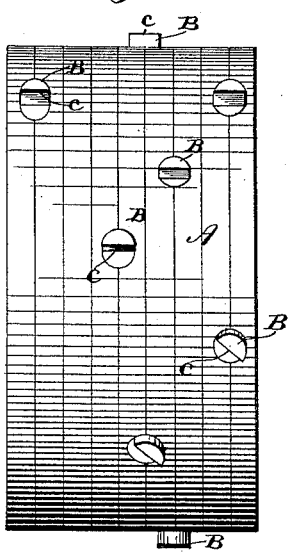
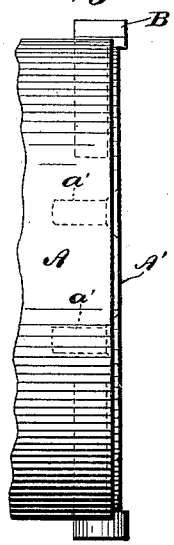
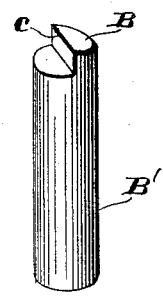
Witnesses.
Chas. R. Burr.
Alex. G. Stewart.
Inventor.
Thomas Eynon
by Franck D. Johns
his Attorneys.

UNITED STATES PATENT OFFICE.

THOMAS EYNON, OF CLEVELAND, OHIO, ASSIGNOR TO EYNON & INGERSOLL, OF SAME PLACE.

MILLING-TOOL.

SPECIFICATION forming part of Letters Patent No. 417,776, dated December 24, 1889.

Application filed November 7, 1888. Serial No. 290,199. (No model.)

*To all whom it may concern:*

Be it known that I, THOMAS EYNON, a citizen of the United States, residing at Cleveland, in the county of Cuyahoga and State of Ohio, have invented certain new and useful Improvements in Milling-Tools; and I do hereby declare the following to be a full, clear, and exact description of the invention, such as will enable others skilled in the art to which it appertains to make and use the same.

My invention relates to certain improvements in milling-tools for milling-machines, more particularly to that class of tools which are used in milling plane surfaces. Heretofore it has been usual in tools of this description to have the teeth or cutters of the tool extend entirely across the face of the same in a line drawn about parallel with the axis of said tool. In the larger tools of this class the maximum of power is required to operate the same, and the teeth or cutters having such a long cutting-edge much friction is developed, causing the tool to become overheated and seriously impairing its effectiveness in operation.

The object of my invention is to overcome these defects and to produce a milling-tool in which the power is gradually applied, and which will develop the minimum of friction between the tool and the surface of the material upon which it is operating.

With these objects in view my said invention consists in certain novelty in the construction, arrangement, and combination of the various parts of the tool, all of which I will now proceed to point out and describe, reference being had to the accompanying drawings, in which—

Figure 1 is a perspective of the preferred form of my said invention; Fig. 2, a cross-section taken through the center of the same. Fig. 3 is a diagram showing the arrangement of the teeth or cutters. Fig. 4 illustrates a further embodiment of my invention, shown in cross-section; Fig. 5, a still further embodiment of the same, shown in elevation. Fig. 6 is a detail showing the cutter provided with projecting teeth. Fig. 7 is a detail showing the teeth or cutters removed.

Referring to said drawings, A represents a cylindrical head having a central aperture, and is adapted to be secured on the spindle or arbor of a milling-machine.

B are independent removable teeth or cutters having shanks B', preferably round in cross-section and secured in radial sockets C, formed in the face or periphery of the head. Said teeth or cutters are held in place by means of screws D, which are inserted in screw-threaded holes E, formed in the ends of the head and communicating with the sockets C. The heads of the screws are countersunk. The ends of the teeth or cutters are cut away or milled to form cutting-edges c, and are beveled back of said cutting-edges. All of the teeth or cutters are of the same length and project the same distance from the face or periphery of the head, so that all points of the cutting-edges of said teeth or cutters will be equidistant from the center of rotation of the head. Said teeth or cutters are arranged in several series extending in parallel lines around the face of the head, so that said teeth alternate. The teeth of one series slightly overlap the line of the teeth of the next series, or are staggered. When in operation, there will be no fin or unfinished portion left upon the surface of the material being milled. The arrangement of the teeth is clearly shown in the diagram, Fig. 3.

Any desired number of teeth may be placed in each series. I, however, prefer to use but three, and arrange the sockets of the same so that said teeth will be located in groups extending in diagonal lines or spirally across the face of the head. Any other arrangement may, however, be adopted, if desired.

In milling-tools of ordinary size but one tooth will be in the same line drawn across the face of the head parallel with its axis. In very large tools—for instance, when using a tool having a sixteen-inch face—it may be desirable to have two teeth in the same line drawn across the face of the head parallel with its axis, as shown in Fig. 5. Any wear of the teeth may be taken up by loosening the retaining-screw of the worn tooth and moving it out the distance required to bring its cutting-edge in line with the others.

From the above description it will be apparent that in tools of ordinary size but one tooth at a time will come in contact with the surface of the material being milled, and in the larger class of tools but two teeth at the same time will be in contact with the work, thus reducing the friction to a minimum and gradually applying the power. Said teeth may be set so that their cutting-edges will be at right angles to the line of rotation of the head, or may be set so that the cutting-edges will be diagonal to said line of rotation in order to give a shearing cut. It is sometimes necessary to mill between two walls, as in milling channels or in milling close to a shoulder. For such work I provide teeth having enlarged heads $B^2$, with cutting-edges which project over the ends of the face or periphery of the head. The sockets for such teeth have to be formed close to the ends of the head, and there would hardly be sufficient material left between the socket and end to stand the strain when in operation. To strengthen the head, I secure to its ends circular plates $A'$ by means of screws $a'$. These plates are made of any desired material, and the cutting-edges of the teeth project beyond the same. In ordinary work said projecting teeth and strengthening-plates are not required, and may be used or not, as desired. Instead of a solid head, a head may be formed of several plates F, as shown in Fig. 4. When using the plates, the sockets are formed part in one plate and part in the adjoining plate. The retaining-screws may also be dispensed with and the teeth clamped between the plates, which are held together by bolts or screws $f$.

If desired, the teeth or cutters may be formed integral with the head and arranged upon its face, as above described. I prefer, however, to use the removable teeth, as they possess many advantages over the stationary teeth.

Various modifications and changes may be made in the construction and arrangement of the several parts of my said invention without materially departing from the spirit and scope of the same, and I do not wish to be understood as limiting myself to the specific construction shown; but

What I claim as new, and desire to secure by Letters Patent, is—

1. A milling-tool for milling smooth surfaces, consisting of a head provided with spirally-arranged cutters projecting from its outer face, so located that but one cutter will be in the same line drawn across the face of the head parallel with its axis and having all points of the cutting-edges of said cutters equidistant from the center of rotation of said head, substantially as shown and described, whereby when said tool is in operation but one cutter at a time will engage with the work.

2. A milling-tool for milling smooth surfaces, consisting of a head provided with spirally-arranged cutters projecting from its outer face, so located that but one cutter will be in the same line drawn across the face of the head parallel with its axis and having all points of the cutting-edges of said cutters equidistant from the center of rotation of said head, and the cutting-edges of the cutters located in the same circular row overlapping the line of cut of the cutters of the adjoining parallel row, substantially as shown and described, whereby when said tool is in operation but one cutter at a time will engage with the work.

3. A milling-tool for milling smooth surfaces, consisting of a head provided with independent and removable cutters spirally arranged upon its outer face, so located that but one cutter will be in the same line drawn across the face of the head parallel with its axis and having all points of the cutting-edges of said cutters equidistant from the center of rotation of said head, substantially as shown and described, whereby when said tool is in operation but one cutter at a time will engage with the work.

4. A milling-tool for milling smooth surfaces, consisting of a head provided with independent and removable cutters spirally arranged upon its outer face, so located that but one cutter will be in the same line drawn across the face of said head parallel with its axis and having all points of the cutting-edges of said cutters equidistant from the center of rotation of the head, and the cutting-edges of the cutters located in the same circular row overlapping the line of cut of the cutters in the adjoining parallel row, substantially as shown and described, whereby when said tool is in use but one cutter at a time will engage with the work.

5. In a milling-tool, the combination, with a head having radial sockets in its outer face arranged in parallel circular rows, of removable cutters secured in said sockets and having all points of the cutting-edges of said cutters equidistant from the center of rotation of said head, substantially as shown and described.

6. In a milling-tool, the combination, with a head having radial sockets in its outer face arranged in parallel circular rows, of removable cutters secured in said sockets and having all points of the cutting-edges of said cutters equidistant from the center of rotation of the head, and the cutting-edges of the cutters located in the same circular row overlapping the line of cut of the cutters located in the adjoining parallel row, substantially as shown and described.

7. In a milling-tool, the combination, with a head having radial sockets in its outer face arranged in parallel circular rows, of radially-adjustable cutters secured in said sockets, substantially as shown and described.

8. A milling-tool consisting of a cylindrical head having several series of independent and removable teeth or cutters arranged in parallel lines upon and projecting the same distance from its face or periphery, the outer series of teeth projecting over the ends of the head, and each of said teeth or cutters extending only partially across said face, substantially as shown and described.

9. The combination, with the cylindrical head A, having the radial sockets C in its face or periphery, and the screw-threaded holes E, communicating with the sockets C, of the independent and removable teeth or cutters B, mounted in the sockets and held in place by the retaining-screws D, said teeth projecting the same distance from the face or periphery of the head, and each tooth or cutter extending only partially across said face, substantially as shown and described.

10. The combination, with the cylindrical head A, having several series of radial sockets C in its face or periphery arranged in parallel lines, of the independent and removable teeth or cutters B, secured in said sockets and projecting the same distance from the face of the head, each tooth extending only partially across said face, and the outer series of teeth having enlarged heads $B^2$, provided with cutting-edges projecting over the ends of said head, substantially as shown and described.

In testimony whereof I affix my signature in presence of two witnesses.

THOMAS EYNON.

Witnesses:
A. F. INGERSOLL,
WINTHROP INGERSOLL.